US005670936A

United States Patent [19]
Estes et al.

[11] Patent Number: 5,670,936
[45] Date of Patent: *Sep. 23, 1997

[54] POWER CONTROLLER ENCLOSURE

[75] Inventors: Wayne S. Estes, Nashville; Carl D. Russell, Watertown, both of Tenn.

[73] Assignee: Emerson Electric Co., St. Louis, Mo.

[*] Notice: The term of this patent shall not extend beyond the expiration date of Pat. No. 5,537,026.

[21] Appl. No.: 430,804

[22] Filed: Apr. 26, 1995

[51] Int. Cl.⁶ .................................................. G08B 23/00
[52] U.S. Cl. .................... 340/501; 340/500; 340/635; 340/638; 340/659; 340/664; 323/239; 323/277; 361/1; 361/57; 361/63; 361/87; 361/91; 307/39; 307/131; 307/140
[58] Field of Search ................................ 5/501, 500, 657, 5/635, 638, 659, 660–664; 364/138–141, 188, 492; 323/237, 239, 320, 289, 282, 277, 274; 361/1, 18, 57, 63, 87, 90–93; 307/38–41, 112, 131, 126, 127, 140

[56] References Cited

U.S. PATENT DOCUMENTS 4,955,069  9/1990  Ionescu ............................ 361/93
5,450,334  9/1995  Pulizzi et al. ..................... 364/492
5,537,026  7/1996  Estes et al. ........................ 323/239

*Primary Examiner*—Donnie L. Crosland
*Attorney, Agent, or Firm*—Polster, Lieder, Woodruff & Lucchesi

[57]  ABSTRACT

A power controller (10) for supplying power to a power distribution network (N) in which power from a polyphase source (G) is routed to using equipment (E) connected to the network through the power controller. A plurality of solid-state power devices (82) switch each separate phase of the polyphase power to the equipment. A firing circuit (14) controls gating of the switches to route the power. Fuses (F) are connected between the switches and the using equipment to interrupt power flow to the equipment if excessive current begins to be drawn. A con. roller (20) controls a shutdown sequence employed by the controller to eliminate current spiking at shutdown. The various components are housed in an enclosure (22) which includes a mounting structure (56) for mounting the aforesaid components. A cooling system (26) employs a fan (88) for directing air flow through the mounting structure to cool the components. The circuit breaker and fuse mounting configurations are such as to allow the enclosure to be more compact than previous, similar enclosures so to provide a smaller, cheaper, more versatile power controller installation.

28 Claims, 12 Drawing Sheets

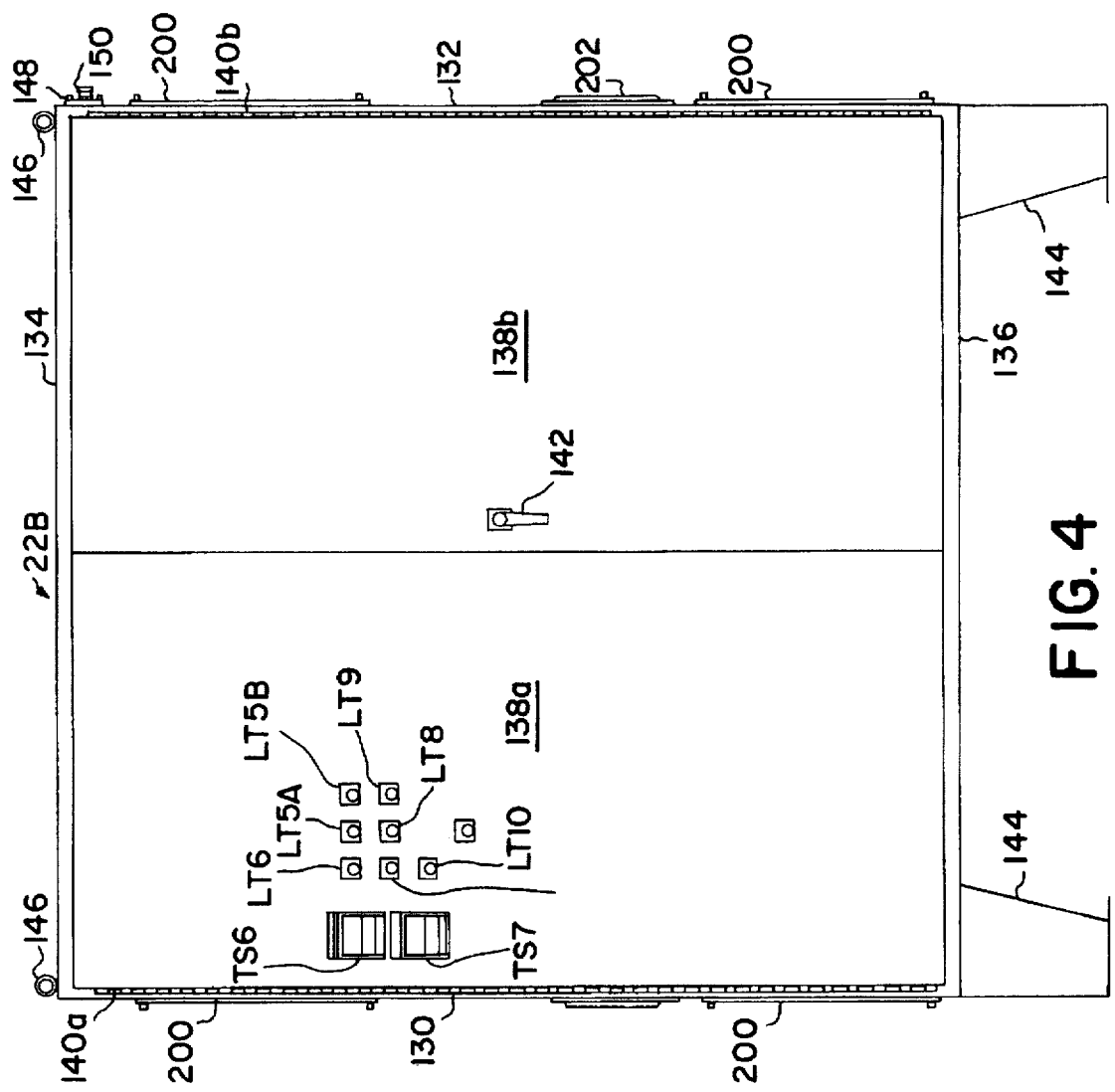
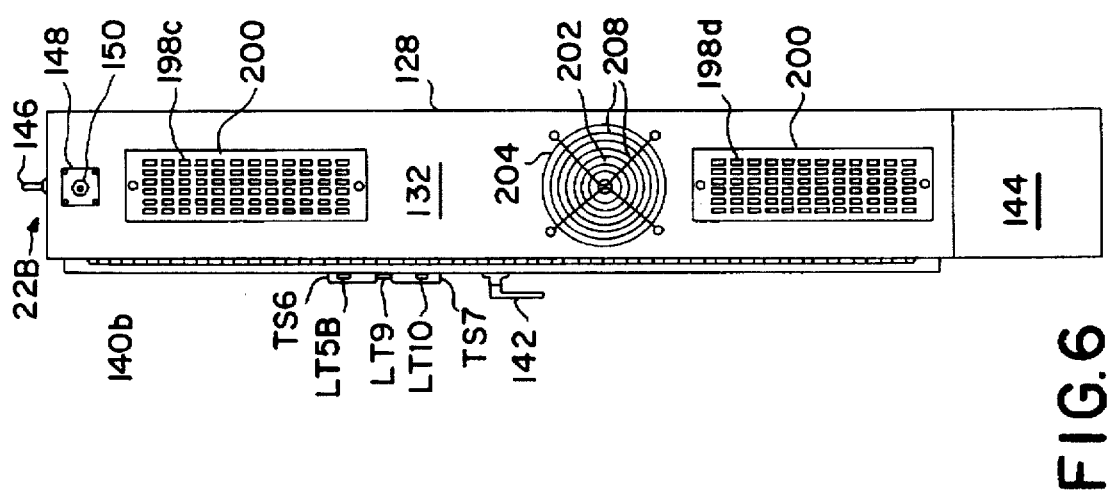
FIG. 4
FIG. 6

FIG.13A
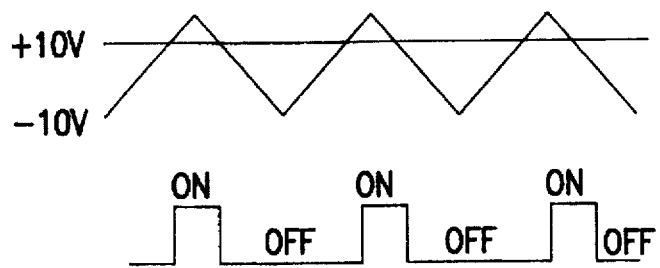
FIG.13B
FIG.14A
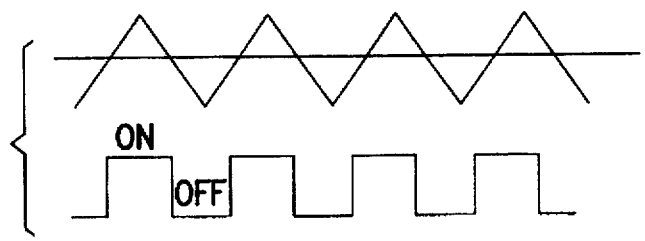
FIG.14B
FIG.14C
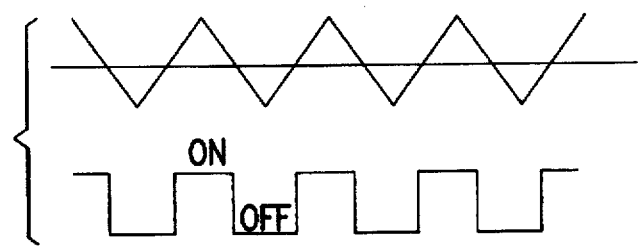
FIG.14D
FIG.15
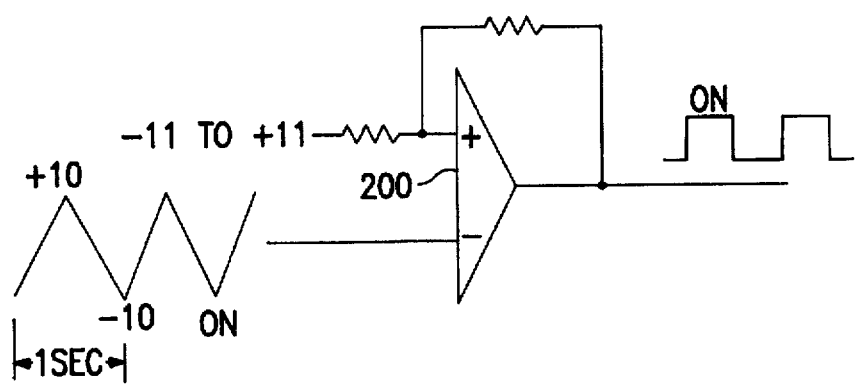

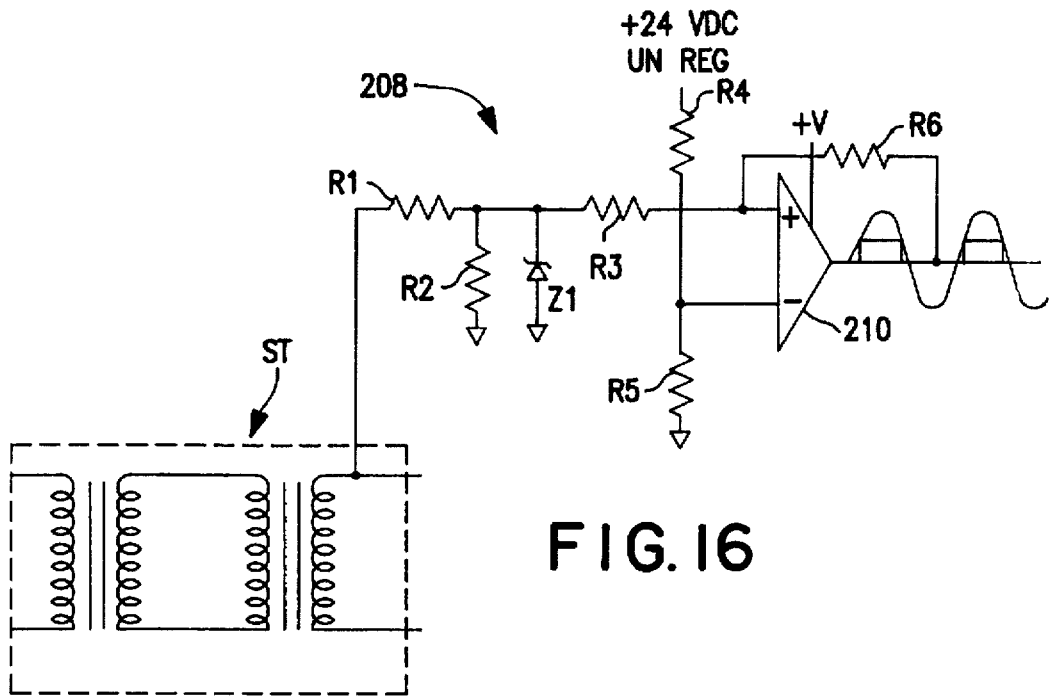
FIG.16
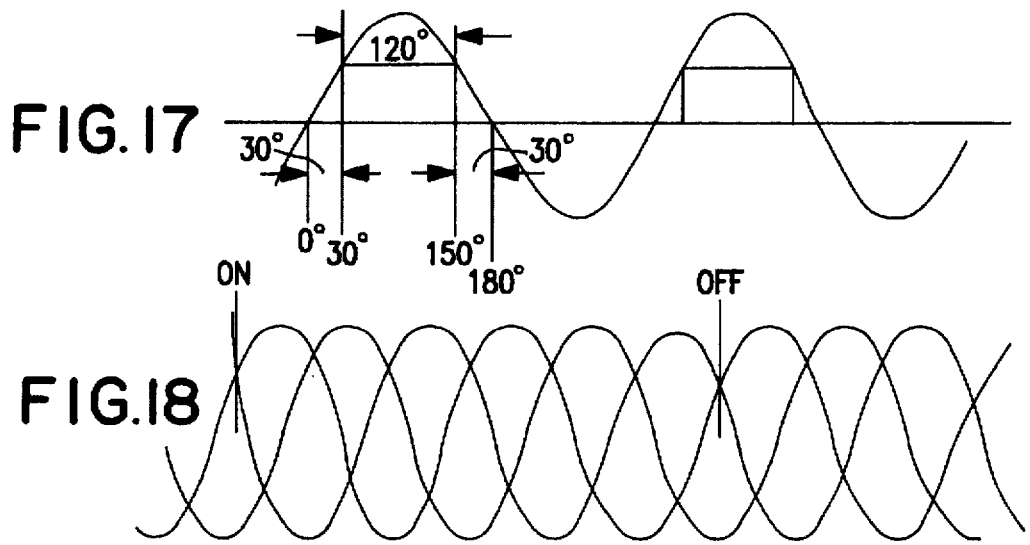
FIG.17
FIG.18
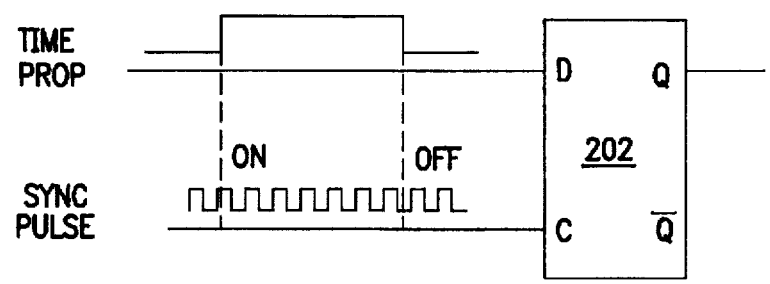
FIG.19

POWER CONTROLLER ENCLOSURE

BACKGROUND OF THE INVENTION

This invention relates to control units for industrial power applications in which high voltage, high amperage single or three-phase power is supplied to a using system and, more particularly, to an enclosure for the power controller and a method of controlling the application of power by the enclosure.

Power controllers are used in industrial applications for example, to supply power to machinery, manufacturing equipment, support systems such as heating and air conditioning, etc. For a particular installation, the controller may handle three-phase voltages of between 208Vac to 600Vac, with currents ranging from 50 A to 2500 A. The power controller provides the interface between the power supplied by an electrical utility, user owned power generating facility, or other supplier, and the electrical distribution network being served. The controller functions to supply power to using equipment under normal operating conditions, as well as interrupt supply of power in the event of overloads or other extraordinary circumstances, to prevent damage to the network and the equipment connected to it.

Power controllers typically require large, expensive installations which involve numerous switches, sensors, and indicators by which power is automatically distributed through the network. The controller, for example, includes a silicon controlled rectifier (SCR) type of power controller, as is well-known in the art. The controller is preceded by either a circuit breaker or an automatic disconnect switch. Also, the controller is wired to the circuit breaker or disconnect switch with this connection usually requiring between two feet and five feet (0.61 m–1.27 m) of cabling. There is not a straight run between the circuit breaker or switch and the power controller. Rather, to preserve space, the cables are bent or folded. However, because of the size and length of the cables, even this type of installation takes up considerable space. And, the cost of the controller includes the cost required to install the cabling in place.

Most large electrical resistance heaters utilize a three-phase circuit with each circuit being individually fused. The SCR type power controller then regulates the amount of electricity supplied to the heater. SCR's, as is well-known in the art, are gated on to allow current flow in a particular direction. Once gated into conduction, the SCR continues conducting until current flow in the desired direction stops. In alternating current power distribution networks, each SCR must be gated into conduction for each half-cycle of the AC input wave form during which current flows to a particular phase. The output of the power controller is first connected to a power distribution unit, and then to a number of three-phase fuse blocks. For example, the output may be wired to six or eight of such blocks. Installation of the distribution unit and fuse blocks consumes between eight and fifteen square feet (2.9 m²–5.5 m²) of enclosure space. This constitutes a substantial volume. In addition to the power distribution unit and fuse blocks, the controller also includes a firing unit or firing package. This firing package has outputs connected to the respective gate input of each SCR. Control or gate inputs for the SCR's are supplied as inputs to the circuitry within the firing package. The firing package, in turn, produces gating signals supplied to the SCR's to gate them into conduction at the proper times. If an overtemperature condition occurs, it is desirable to shut down the controller in a controlled manner to prevent damage to the using equipment. Also, conventional controller designs make it difficult to replace a SCR.

An additional concern with respect to the supply of power to using equipment is the generation of DC components within the system. DC current, for example, can damage not only transformers upstream from the controller, but also downstream inductive loads. Because of the amount of heat generated within an enclosure, the SCR power controllers are either air cooled or water cooled. The SCR's are the primary heat generators within the enclosure. If air cooled, a fan is mounted on the enclosure to blow air over heat sinks on which the SCR's are mounted to remove the heat generated by their operation. In standard enclosure designs, the fan is installed to one side of the enclosure so it will either pull air into, or push air through, the enclosure. For this purpose, a side or back panel of the enclosure is formed with a series of louvers to allow appropriate air flow. However, this type of cooling arrangement is inefficient. Usually, unless additional fans are used to aid air circulation through the enclosure, temperature increases of 25° F.–35° F. (13° C.–19° C.) within the enclosure may routinely occur. Each of the foregoing indicate problems with controller designs which either add to the overall cost of the enclosure, render the controller unable to perform as efficiently as possible in supplying power to the network and equipment connected to it, or both. An improved design of the power controller and its installation enclosure would provide for a lower cost, more versatile installation assembly.

SUMMARY OF THE INVENTION

Among the several objects of the present invention may be noted the provision of a controller for use in a power distribution network for supplying single-phase, or three-phase power, as appropriate, to using equipment connected to the network; the provision of such a controller having a compact design so to be less costly to manufacture and assemble, and to require less space when installed at a using site; the provision of such a controller employing bus bars rather than cabling for connecting between a power controller installed in the enclosure and a circuit breaker or control switch which controls power flow to the controller; the provision of such a controller further to incorporate fuse bars in the output of the controller rather than fuse blocks; the provision of such a controller in which use of fuse bars requires substantially less space (approximately only 10%–15% as much space) within the enclosure as conventional fuse blocks; the provision of such an enclosure in which components installed therewithin are easily and readily cooled; the provision of such an enclosure in which a fan for moving air through the enclosure is so situated that the last components over which air is drawn prior to being exhausted from the enclosure are those components which generate the most heat; the provision of such an controller employing a pair of firing packages for controlling power to using equipment; the provision of such an enclosure in which one firing package employs a reference waveform to ascertain the ratio of power for the time when power is supplied to the equipment and the time when it is not supplied during a given interval, and the other firing package uses the inverse of the waveform for the same purpose whereby power supply to the equipment occurs fully throughout the interval but with each firing package supplying power for a different portion of the interval; the provision of such a controller having a unique shutdown sequence for powering down the controller; the provision of such a controller in which the sequence first enables the power controller to be rendered inactive prior to opening any circuit breakers so the circuit breakers are opened under no load conditions thereby eliminating electrical arcing; the provision of such a sequence to prolong the useful life of the circuit breakers; the provision of such a controller to sense the heat sink temperature of the heat sinks on which SCR's of the power controller are mounted, and to initiate the unique shutdown sequence if the sensed heat sink temperature exceeds a predetermined value; the provision of such a controller further to initiate a shutdown sequence if control signals supplied to a firing package which gates the SCR's into conduction are found to be out of tolerance; the provision of a simplified mount for holding the SCR's in place and for facilitating their replacement; the provision of such a controller to provide an audible alarm in the event of a shutdown, the provision of such a controller to incorporate two separate power distribution network controls; and, the provision of such a controller to provide both a master and a slave firing package.

In accordance with the invention, generally stated, a power controller supplies power to a power distribution network in which power from a polyphase source is routed to using equipment connected to the network through the power controller. A plurality of solid-state power devices switch each separate phase of the polyphase power to the equipment. A firing circuit controls gating of the switches to route the power. Fuses are connected between the switches and the using equipment to interrupt power flow to the equipment if excessive current begins to be drawn. Circuit breakers are connected between the power source and the switch means to interrupting flow of current to a piece of using equipment if the piece begins drawing excessive current. A controller controls a shutdown sequence employed by the controller to eliminate current spiking at shutdown. The various components are housed in an enclosure which includes a mounting structure for commonly mounting the aforesaid components. A cooling system is provided for directing air through the mounting structure to cool the components. Other objects and features will be in part apparent and in part pointed out hereinafter.

BRIEF DESCRIPTION OF THE DRAWINGS

FIG. 4 is a front elevational view of a second enclosure embodiment;

FIG. 6 is a side elevational view of the enclosure;

FIGS. 8-1, 8-2 are a wiring diagram for a power controller housed in the second controller embodiment;

FIG. 13A represents a triangular waveform generated by a master firing package of the controller, and FIG. 13B represents a proportional control signal used by the controller;

FIGS. 14A–14D represent the signals used when two controllers of the second controller embodiment are utilized to operate a heater or similar piece of equipment where FIGS. 14A and 14B are the signals employed in one of the two firing packages, and FIGS. 14C and 14D are those used by the other firing package;

FIG. 15 is a schematic of a conditioning circuit for producing the proportional control signal;

FIG. 16 is a schematic of a control circuit for sync pulse generator of the controller;

FIG. 17 represents a switch timing wave form within the controller;

FIG. 18 represents a full cycle wave form of the power control circuit of the controller;

FIG. 19 is a schematic of a flip-flop used in the circuit with respective inputs supplied to it; and, FIG. 20 is a simplified block diagram of the power controller as part of a power distribution network.

Corresponding reference characters indicate corresponding parts throughout the several views of the drawings.

DESCRIPTION OF A PREFERRED EMBODIMENT

Figure 20:
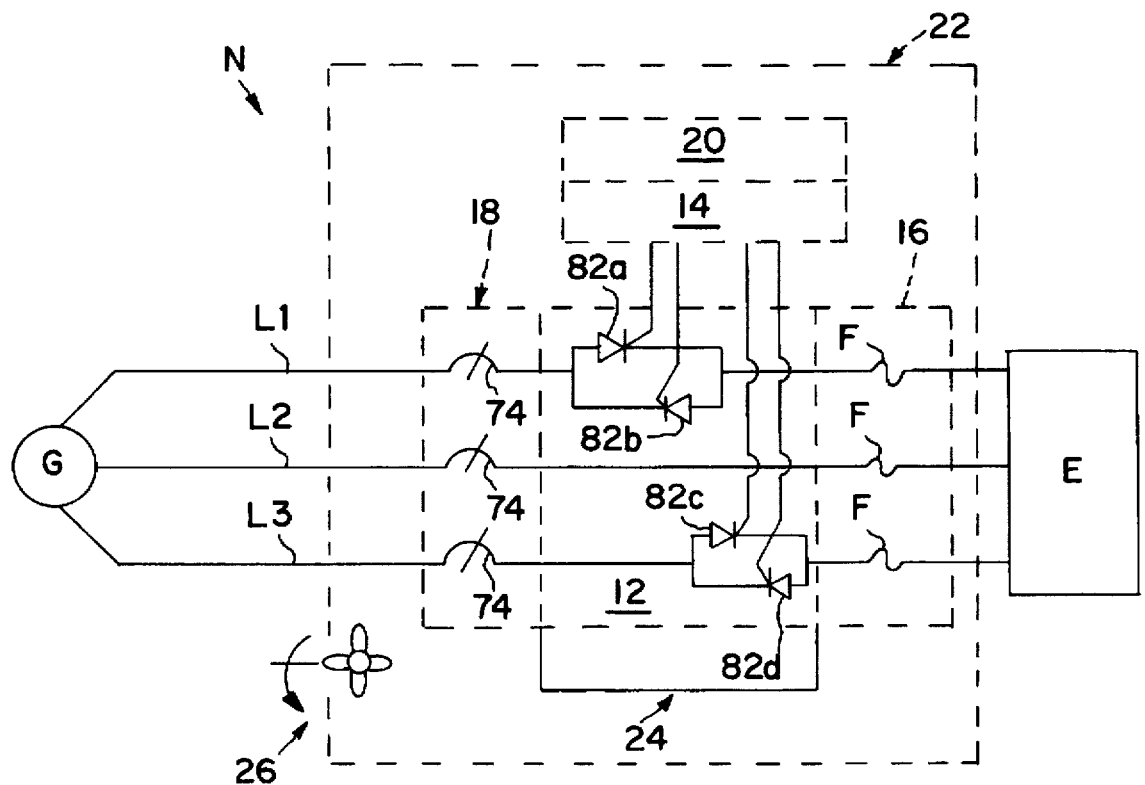
Figure 11:
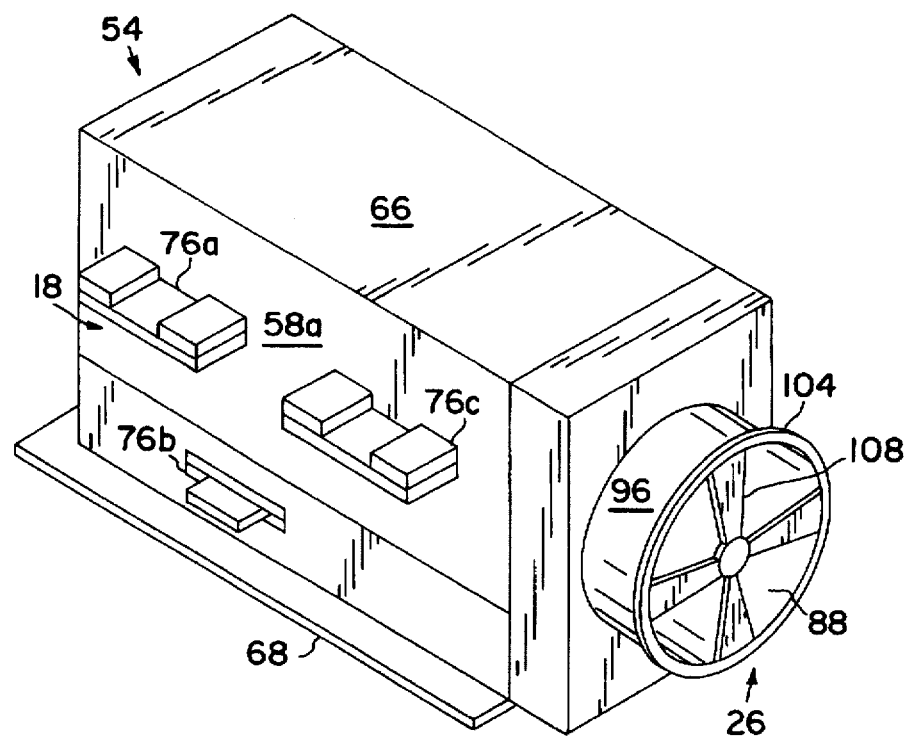
FIG. 11 is a perspective view of the power controller assembly from the circuit breaker side of the assembly.
Figure 12:
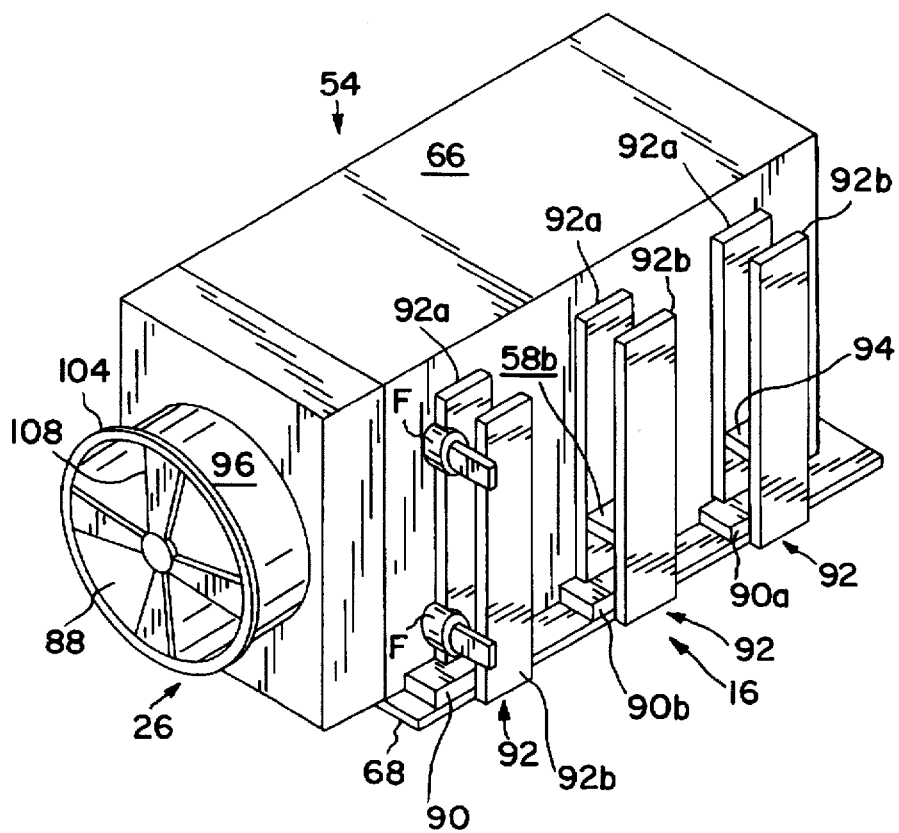
FIG. 12 is a perspective view of the power controller assembly from the load fusing side of the assembly.

Referring to the drawings, a power distribution network N including a power controller 10 of the present invention is shown in FIG. 20. Power controller 10 provides the interface between the power supplied by an electrical utility G, user owned power generating facility, or other source of supply, and electrical equipment E being connected to the network. For example, the power controller may be used to supply power to one or more industrial heaters. Although only one representational piece of equipment E is shown in FIG. 20, it will be understood that more than one piece of equipment may be connected to the network. Although described in more detail hereinafter, power controller 10 includes a switch means 12 for muting each separate phase of the polyphase power from source G to the using equipment E. A firing means 14 operates to gate the switch means into conduction to route the power to the equipment. Fuse means 16 are connected between the switch means and the using equipment to interrupt power flow to the equipment if the equipment begins drawing excessive current. A circuit breaker means 18 is connected between the power source and the switch means and interrupts flow of current to the switch means if excessive current is drawn by the using equipment. A control means 20 controls a unique shutdown sequence, as described hereinafter, when a shutdown occurs. An enclosure 22 is provided for the various means. The enclosure includes a mounting means 24 for mounting commonly the switch means, firing means, fuse means, circuit breaker means, and control means. Finally, a cooling means 26 is provided for directing air flow through the mounting means to cool the aforesaid components.

Figure 1:
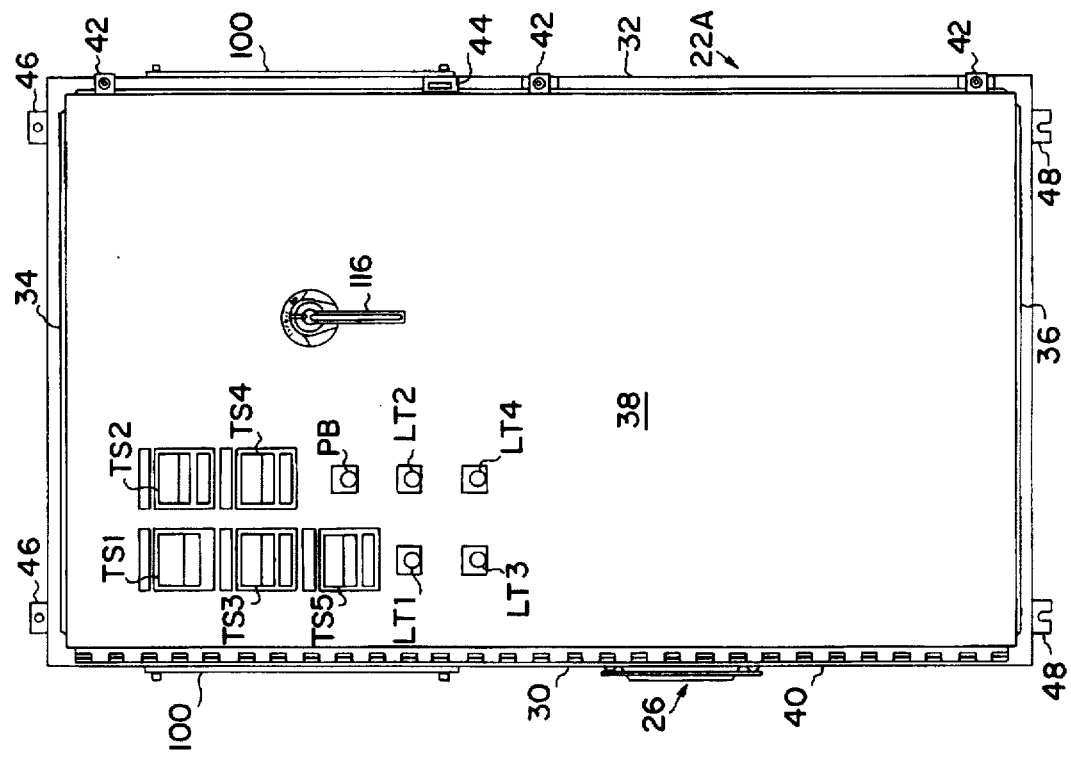
FIG. 1 is a front elevational view of an enclosure of the present invention for a power controller.
Figure 3:
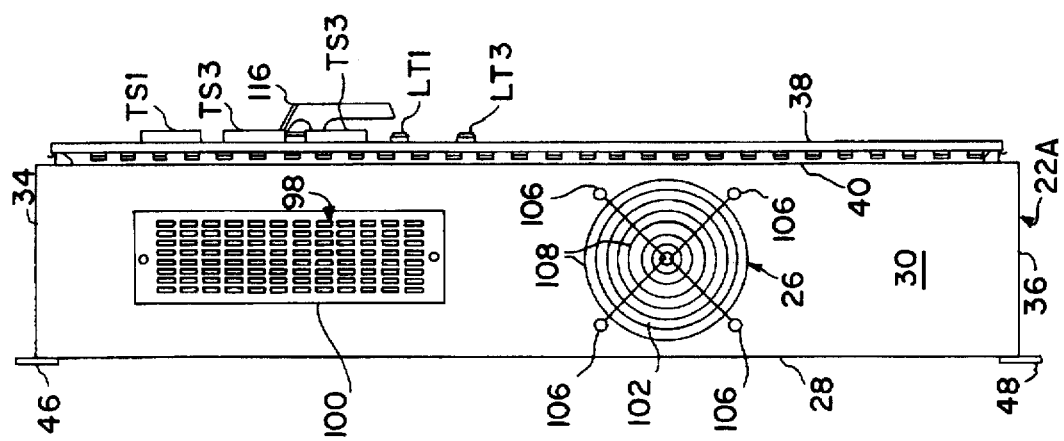
FIG. 3 is a side elevational view of the enclosure.
Figure 2:
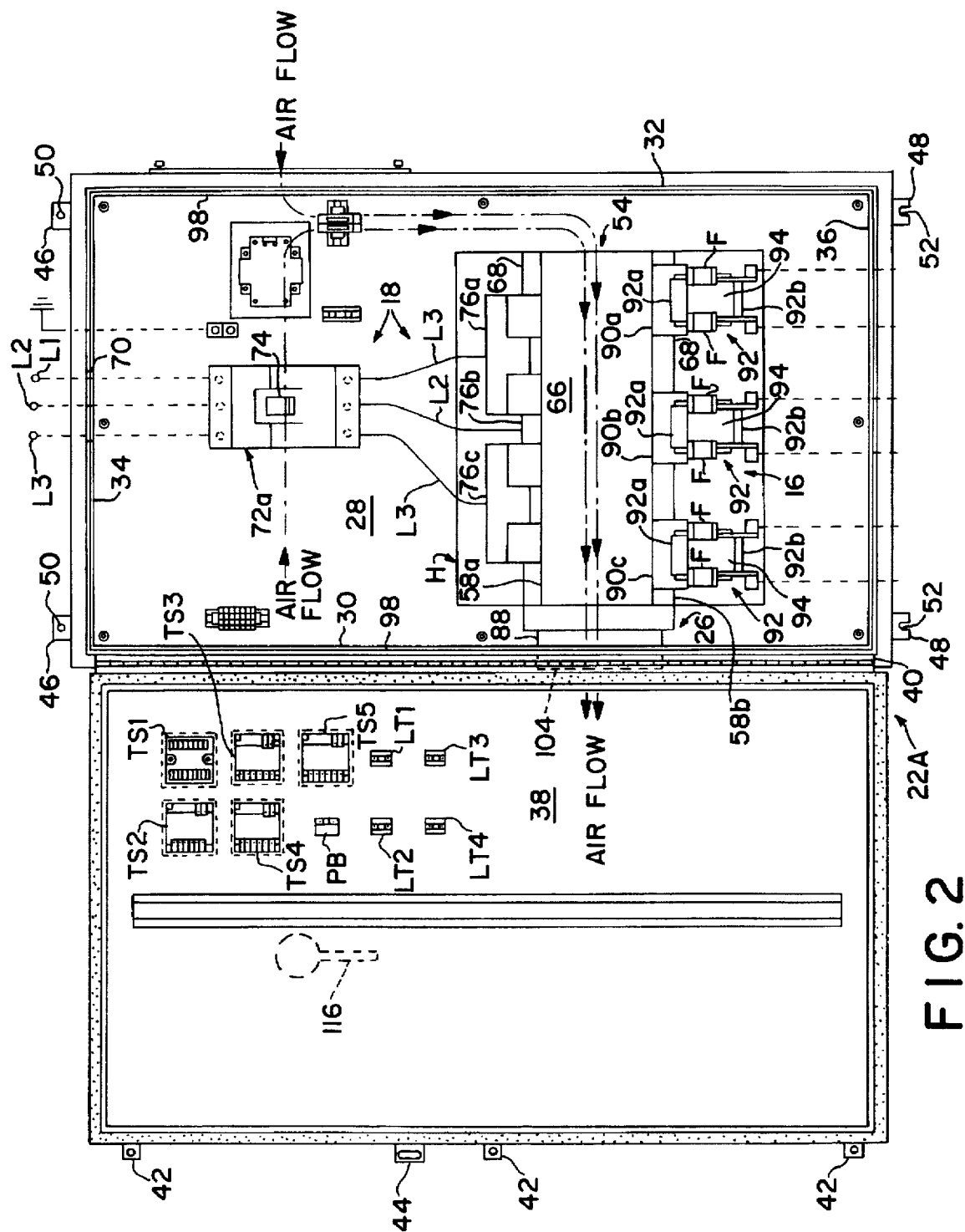
FIG. 2 is an elevational view of a front panel of the enclosure.

Referring to FIGS. 1–3, a first embodiment of enclosure 22 is indicated generally 22A. The enclosure includes a rear panel 28, opposed side panels 30, 32, top and bottom panels 34, 36, and a hinged front panel 38 which forms a door for accessing the enclosure. Door 38 attaches to side panel 30 by a hinge 40 which extends the vertical length of the door. The respective panels are of a sheet metal or a suitable plastic material. Spaced locking members 42 are attached to the opposite side of the door for locking the door in place and preventing inadvertent contact with the power controller components. In FIG. 3, three such locking members are shown, one at the upper and lower ends of the front panel, and one in the middle. A handle 44 attaches to this side of the door for a person to swing the door open or shut after it is unlocked. It is a feature of the invention that enclosure 22A be substantially smaller than prior enclosures. This makes the enclosure more compact to facilitate its installation in more locations than was previously possible. Enclosure 22A is, for example, 30" (76.2 cm) wide, 60" (152.4 cm) high, and 12" (30.5 cm) deep. Further, the enclosure is a lighter weight enclosure than previous models and cheaper to manufacture. Because of its compact size and light weight, enclosure 22A can be wall mounted. For this purpose, mounting plates 46 attach at the upper end of the rear panel, and mounting plates 48 at the lower end thereof. The plates 46 have screw holes or bolt holes 50 for mounting the enclosure; while, the plates 48 have slots 52 for the same purpose.

Figure 10:
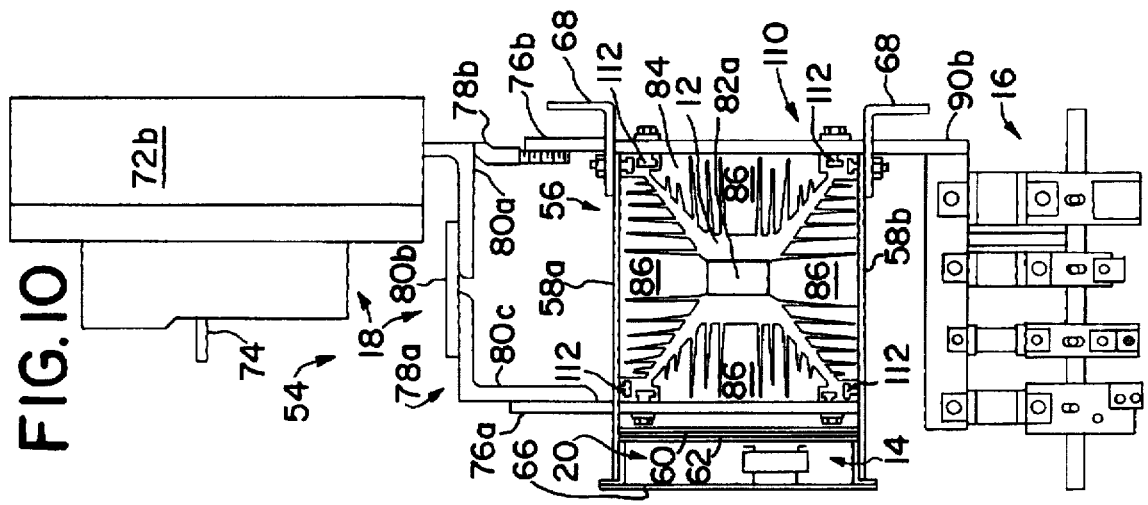
FIG. 10 is an end view of the power controller assembly.

Referring to FIG. 2, a power controller assembly is indicated generally 54. The assembly is shown in more detail in FIGS. 9A-12 and comprises mounting means for mounting switch means 12, firing means 14, fuse means 16, circuit breaker 18, and control means 20. In FIG. 10, the mounting means is shown to comprise a generally U-shaped frame 56 having opposed legs 58a, 58b, and a base or top 60. A circuit board 62 is mounted on the outside of plate 60. This circuit board includes a master firing package 64 (see FIG. 7) and other control electronics. A cover plate 66 is installed over the circuit board. L-shaped flanges 68 attach to legs 58a, 58b of the flange for mounting the frame to rear panel 28 of the enclosure. When installed in the enclosure, as shown in FIG. 2, the power controller assembly is oriented such that the circuit means extends from the top of the assembly, and the fuse means from the bottom thereof. For safety of personnel gaining access to the inside of the enclosure, a plexiglass or similar type of clear shield or cover H is installed over the outer face of the power controller assembly, fuse means, and circuit breaker means.

Figure 9A:
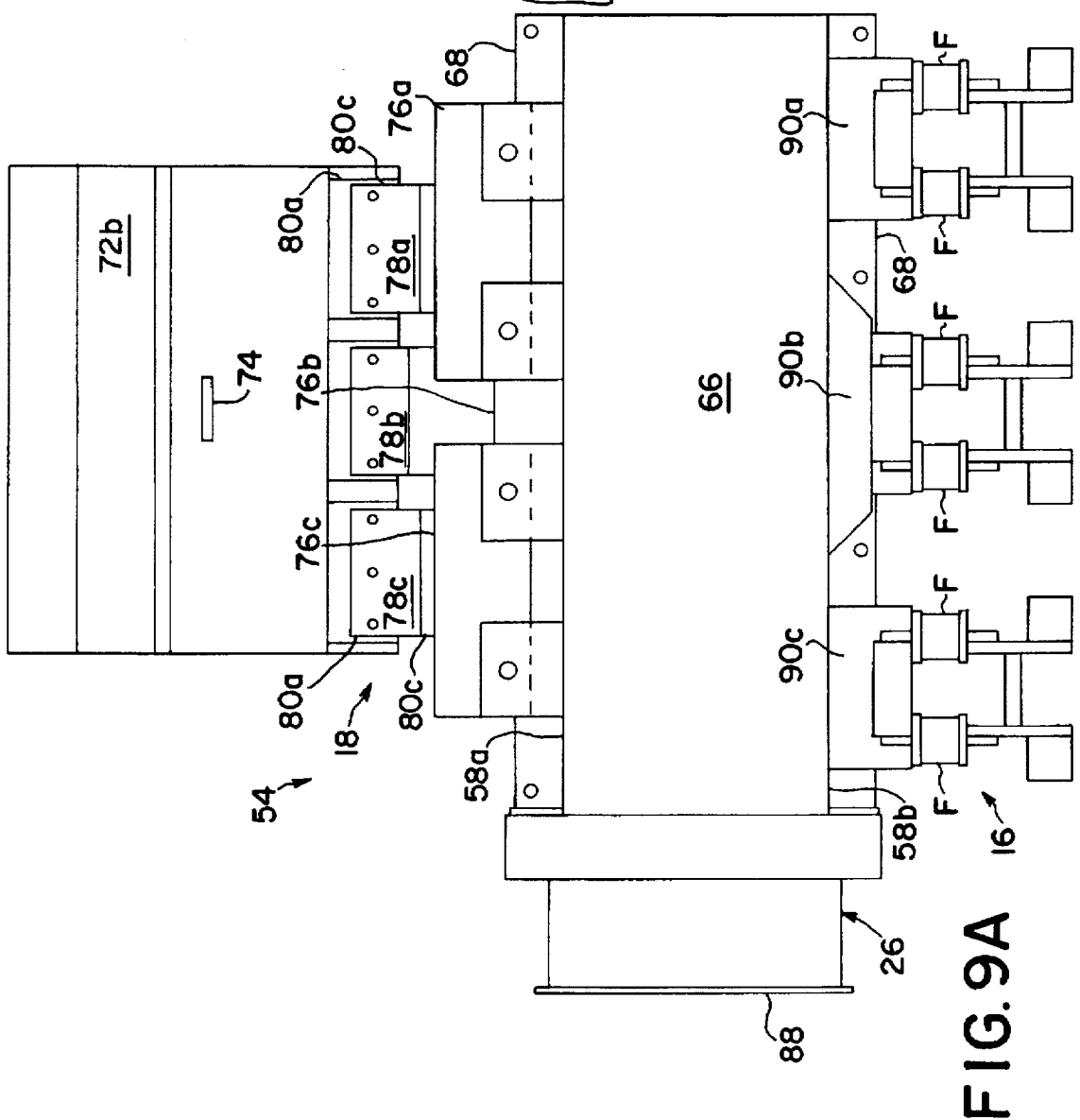
FIG. 9A is a top plan view of a power controller assembly including load fusing, circuit breakers, and cooling fan installations.
Figure 9B:
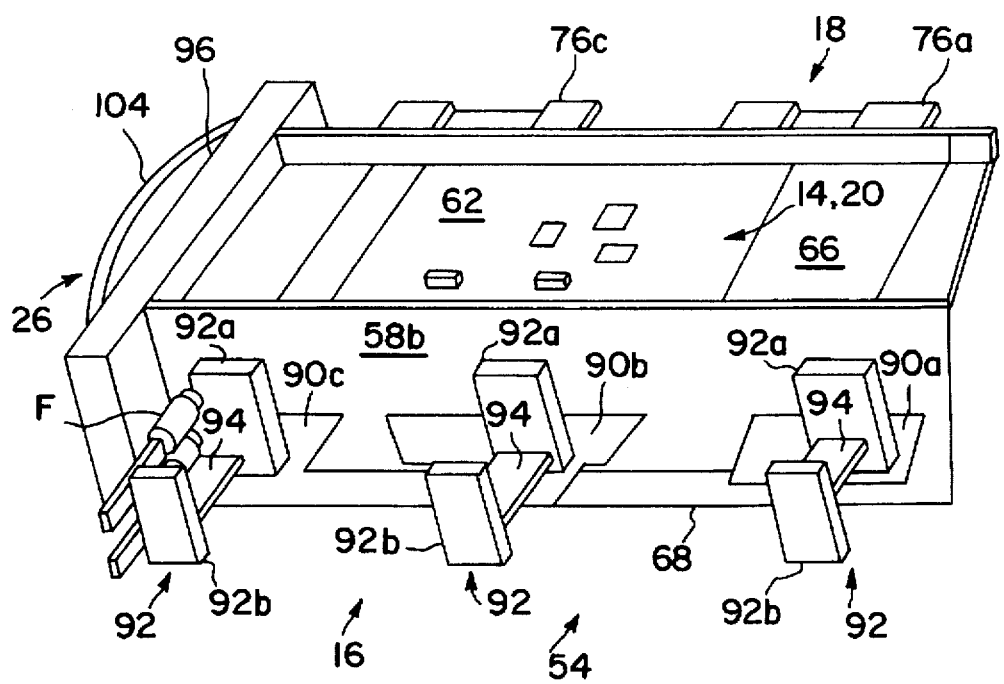
FIG. 9B is a perspective view of the assembly with a top cover removed.

Power lines L1–L3 for three-phase power supplied by source G are routed into enclosure 22A through an opening 70 in the top of the enclosure. The power lines are terminated at one side of a circuit breaker 72a (see FIG. 2) or 72b (see FIGS. 9A and 10). These circuit breakers are, for example, 1200 A circuit breakers and comprise part of circuit breaker means 18. Either circuit breaker incorporates an ON/OFF or power disconnect switch 74 which is operable by control means 20 to open the circuit breakers as described hereinafter. Once power to the using equipment has been disconnected, switch 74 is manually reset to reconnect the power. Means 18 further includes electrical connectors 76a–76c for connecting each phase of the three-phase power input through the circuit breaker to power controller assembly 54. Each connector comprises a flat plate type electrical connector. In FIG. 2, the power lines L1–L3 on the output side of the circuit breaker are respectively terminated to one of the connectors 76a–76c. In FIGS. 9A and 10, each power output line from the circuit breaker comprises a bus bar 78. A middle bus bar 78b comprises a flat bus bar which electrically connects with connector 76b. The respective end bus bars 78a, 78c each include a first L-shaped flat bus bar section 80a, an intermediate flat plate section 80b, and a second L-shaped bus bar section 80c which electrically connects with the respective connectors 76a, 76c. The use of the three segment bus bar construction for two of the three phases allows circuit breaker 72b to abut against the rear enclosure panel 28 when power controller assembly 54, to which the circuit breaker is both mechanically and electrically attached, is installed in the enclosure.

Figure 7:
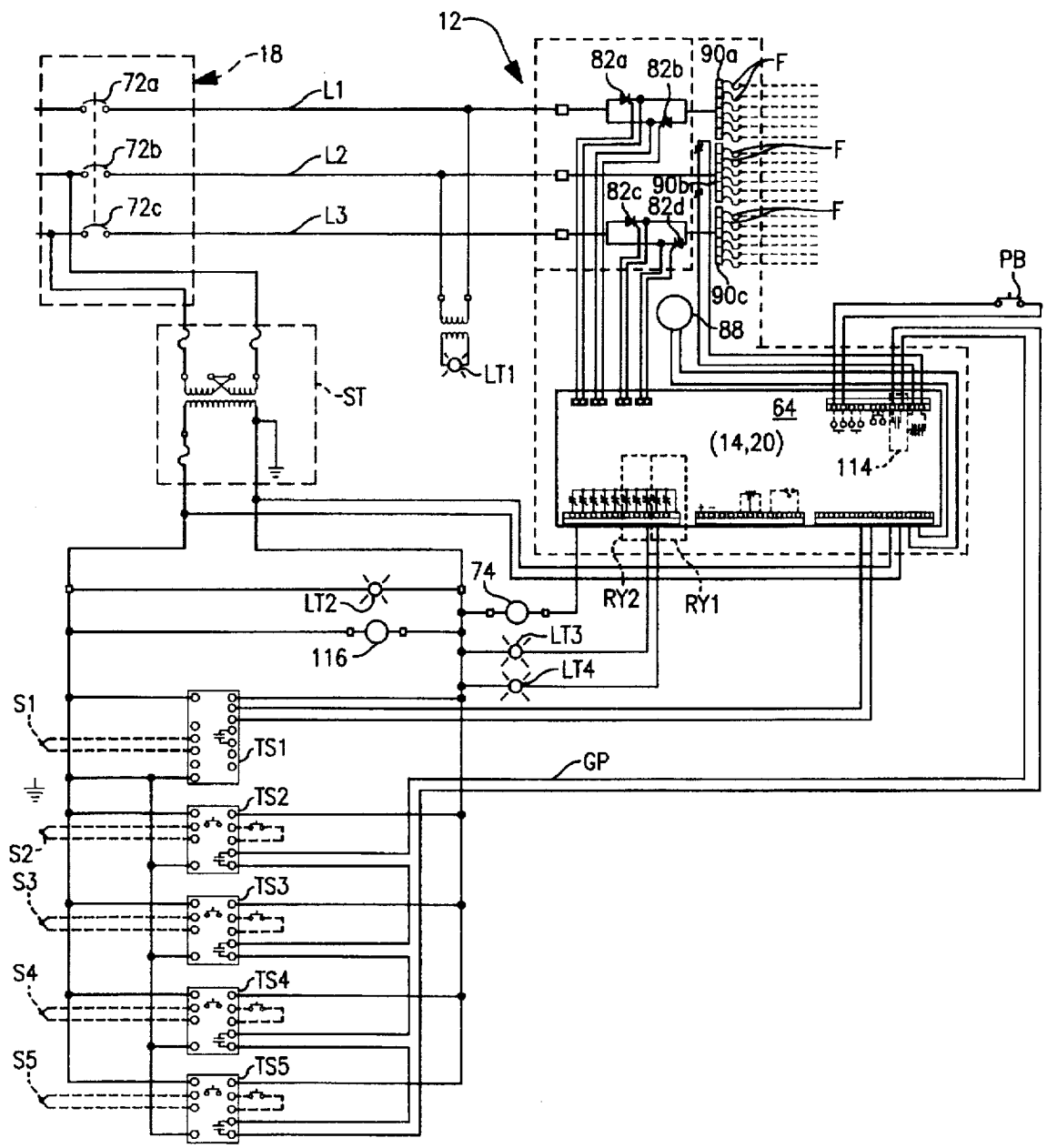
FIG. 7 is a wiring diagram for a power controller housed in the first enclosure embodiment.

Switch means 12 includes a plurality of solid state power devices which, when gated into conduction, allow current flow to the using equipment. In FIGS. 7, 10, and 20, these solid state devices are shown to be silicon controlled rectifiers (SCR's) 82a–82d. Two SCR's 82a, 82b are connected in inverse parallel for one phase line; and the other two SCR's 82c, 82d are connected in inverse parallel for a second phase line. There are no SCR's or other solid state power control devices associated with the third phase line. The SCR's are used because they can be cycled faster than other types of switches. A contactor type switch can be cycled, for example, at a rate of three times per minute. SCR's 82a–8d can be cycled once per second or faster. By using SCR's instead of mechanical switches such as contactors, power controller 10 can modulate small amounts of power to a load. In doing so, it allows closer temperature control than is available with these other types of switches. Gating of the SCR's is via the circuitry incorporated in the master firing package 64 of firing means 14. In conventional power controllers, the circuit breakers are wired to the solid state switches. The circuit breaker are supplied with connectors for this power wiring. In large power prior art controllers, several square feet of enclosure space is required for bending this wiring so proper electrical connections can be made. With enclosure 22 of the present invention, and the power controller assembly and circuit breaker means, as described, this wiring, and the space required to accommodate it are eliminated altogether, or substantially reduced. This enables the enclosure to be substantially smaller than conventional enclosures.

Each of the SCR's 82 is separately mounted on a heat sink 84 one of which is shown in FIG. 10. Each heat sink is sized so it can be installed between the legs 58a, 58b of frame 56. Further, each heat sink has four sections 86, one of which is formed along each side of the heat sink for distributing the heat generated by operation of the SCR. An open space is formed between the various sections 86 of the heat sink. A fan 88 of cooling means 26 is installed at one end of the power controller assembly. The fan draws air through a channel formed by the sides of frame 56. Since the SCR's are mounted on their heat sinks in this channel, the circulating air in the enclosure is drawn directly through the channel immediately before being exhausted from the enclosure. The resultant cooling provided by fan 88 allows the SCR's to operate at higher currents than otherwise would be possible.

Next, fuse means 16 includes a plurality of fuse bars 90a–90c through which power is distributed to individual heaters or other pieces of using equipment. Most large electric resistance heaters, or similar equipment, consist of several three-phase circuits. These circuits typically are individually fused. When a power controller 10 is used to regulate power to this equipment, the controller output is provided to a power distribution unit including the fuse bars. A fuse bar 90a is connected to the SCR circuit comprising SCR's 82a, 82b. Similarly, a fuse bar 90c is connected to the SCR circuit comprising SCR's 82c, 82d. A fuse bar 90b is directly connected to circuit breaker bus bar 76b. Each fuse bar has an associated fuse mounting assembly 92 for installing individual fuses F for a particular heater or other piece of equipment. Each assembly 92 includes a pair of spaced posts 92a, 92b. The posts are separated from each other by a spacer 94. Each fuse F is mounted on an assembly 92 between respective posts 92a, 92b. The input line to the equipment then has an in-line fuse. Each assembly 92 can accommodate up to ten fuses F. If enclosure 22 is made deeper than 12" (30.5 cm), the posts can be longer and more fuses can be accommodated.

The provision of fuse means 16 as described herein above greatly reduces the amount of enclosure space required to properly fuse the equipment supplied power through controller 10. Use of the fuse bar construction saves up to 85%–90% of the space previously required for fusing, substantially reducing both enclosure size and cost.

Cooling means 26, as noted, includes a fan 88. The fan is enclosed in a shroud or housing 96 located at one end of power controller assembly 54. Respective side panels 30, 32 of the enclosure each have openings 98 formed toward their upper ends, each opening being covered by a grating 100 attached to the respective side panel. A circular opening 102 is additionally formed in side panel 30 adjacent the location of fan 88 when the power control assembly is mounted in enclosure 22A. The outer end of housing 96 has a circumferentially extending mounting flange 104 which has spaced openings for attaching the housing to panel 30 using screws 106. Flange 104 abuts against the inside wall of side panel 30. The location of fan 88 allows circulating air drawn into the enclosure through openings 98 to be drawn over the heat sinks 84 on which the SCR's are mounted. The fan provides a forced air flow through the channel portion of frame 56 to ensure heat is extracted from the heat sinks and a lower operating temperature for the SCR's is provided. In conventional air cooled power controllers, the fan is mounted such that air is forced over, rather-than drawn over, the heat sinks. Cooling means 26 is a more efficient cooling means than those previously used.

Referring again to FIG. 10, the power controller further includes a holding means 110 for holding the bolts of SCR clamps in place so they cannot rotate and drop out when the top of the clamps and the top of a heat sink are removed to replace an SCR. This makes replacement of a failed or faulty unit much simpler than would otherwise be possible.

Figure 5:
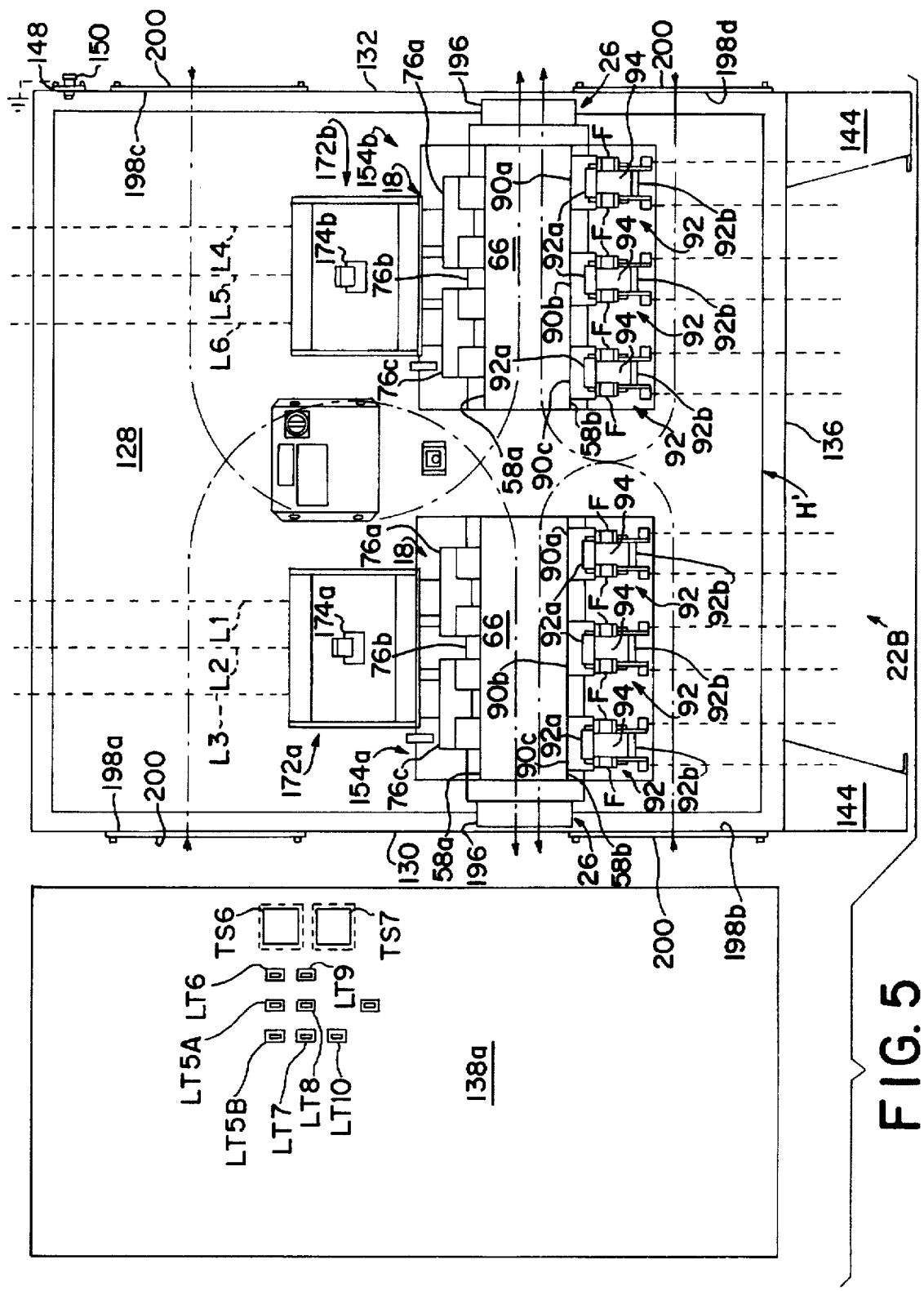
FIG. 5 is an elevational view of the front panel of the enclosure.

Referring to FIGS. 4–6, a second embodiment 22B of the enclosure of the present invention is shown. This enclosure includes a rear panel 128, opposed side panels, 130, 132, top and bottom panels 134, 136, and a pair of hinged front panels 138a, 138b forming access doors for the enclosure. Door 138a is attached to side panel 130 by a hinge 140a, and door 138b to side panel 132 by a hinge 140b. Door 138b has a handle 142 for opening the door. Handle 142 has a lock for preventing unauthorized access to the power controllers housed in the enclosure. Because of its weight, enclosure 22B is designed to rest on a floor rather than being wall mounted. For this purpose, the enclosure has legs 44 on each side to support it. Eyebolts 146 are fitted into top panel 134, on opposites of the enclosure, to facilitate lifting and moving of the enclosure. And, a plate 148 attached to the upper end of side panel 132 has a grounding connection 150 for grounding the enclosure. Enclosure 22B is designed to house two power controller assemblies 54 and its dimensions are accordingly, for example, 60" (152.4 cm) wide, 60" (152.4 cm) high, and 12" (30.5 cm) deep. Thus, although enclosure 22B is larger than enclosure 22A, the enclosure is still a more compact unit than comparable previous units. As such, it is also a lighter weight and cheaper to manufacture enclosure.

Referring to FIG. 5, enclosure 22B is provided with two power control assemblies 154a, 154b installed in a side-by-side configuration within the enclosure. Each assembly is similar to the assembly 54 as shown in FIGS. 9A–12 and described herein above. Accordingly, these power controller assemblies are not described in detail. Again, each assembly includes a frame 56 for mounting the SCR's 82 and their associated heat sinks 84, a circuit board 62 including a master firing package 64, circuit breaker means 18, and fuse means 16. Each unit 154 shown in FIG. 5 has its cover plate 66 installed. Also, a shield H', which is a clear plexiglass shield, covers both assemblies to protect personnel having access to the enclosure. The embodiment of enclosure 22B is supplied with power over two separate sets of power lines, power lines L1–L3 which supply power to using equipment through power control assembly 154a, and power lines L4–L6 for the three-phase power supplied through power control assembly 154b. When used with industrial heating equipment, the power supplied through the controller is typically 480V three-phase power. The power lines terminate at one side of respective circuit breakers 172a, 172b which are again, 1200 A circuit breakers, for example. Each circuit breaker unit includes a power disconnect switch 174a, or 174b operable by control means 20 of the respective firing package. The routing of power through the circuit breakers and the fuses is as previously described. Again, each of the respective fuse bars 92 can accommodate up to ten separate fuses F.

Each power control assembly 154 includes a cooling means 26 having a fan 88. Because the power controller assemblies are installed side-by-side, the fan 88 in one assembly is oppositely installed from that in the other assembly so the respective fans are located adjacent a side panel of the enclosure. The respective fans are enclosed in housings 196. The respective side panels 130, 132 of the enclosure each have openings 198 formed therein, panel 130 having upper and lower openings 198a, 198b, and panel 132 openings 198c, 198d. Each opening is covered by a grating 200 attached to the respective side panel. A circular opening 202 is also formed in each side panel 130, 132 adjacent the location of the fan 88 when the respective power control assemblies are mounted in enclosure 22B. Housing 196 again has a circumferentially extending mounting flange 204 which abuts against the inside wall of the side panels. In this embodiment, circulating air is drawn into the enclosure through the openings 198. The respective fans 88 draw the air over the heat sinks in each power control assembly 154 on which the respective SCR's are mounted. The forced air flow through the channel portion of each control assembly frame 56 extracts heat from the heat sinks and lowers the operating temperature for the SCR's.

Referring to FIG. 7, the firing and control circuits comprising means 14 and 20 are shown to include the master firing package 64, a step-down transformer ST for providing a single-phase 115Vac–120Vac input to the firing package, and switches and sensors for use by the control means to control operation of the power controller. Transformer ST is connected across input lines L2–L3. A status light LT1 is connected across lines L1 and L2 to provide a visual indication of when power is supplied to controller 10. As shown in FIG. 1, status light LT1 is located on door panel 38 of enclosure 22A. Additional status lights LT2–LT4 are also installed on door panel 38 for easy visibility to one monitoring the status of the power controller's operation. Light LT2 is a status light indicating when the controller power is "ON". This light is connected across the secondary side of transformer ST. Light LT3 is a status light for the equipment powered using power controller 10. If the operating temperature of the equipment exceeds a preset temperature limit, this will trigger an equipment power-down. Light LT3 is illuminated if this occurs. Light LT4 is a status light indicating whether or not the temperature of the heat sinks 84 are within an acceptable limit. If, for example, a fan 88 fails, or an air discharge opening from the enclosure becomes blocked, air circulation through the enclosure would cease, and the heat sink temperature would rise to unacceptable levels, possibly damaging the SCR's 82. To prevent this, there is a shut-down of the controller if the heat sink temperature exceeds the limit; and, status light LT4 provides an indication if this happens. Both status lights LT3 and LT4 are connected between the secondary of transformer ST and firing package 64. A relay RY1 is associated with the heat sink monitoring. If illuminating light LT4 is through the relay, status light LT3 is similarly controlled through a relay RY2. The shut-down sequence implemented using master firing package 64 is described hereinafter.

Temperature switches TS1–TS5 for a heater and other equipment to which power controller 10 is connected and whose operating condition is monitored are mounted on front panel 38 of the enclosure. Each temperature switch is connected in parallel across the secondary of transformer ST. Further, each switch is a relay type switch whose operation is controlled by the sensed temperature of the element monitored by the switch. All the switches are commonly grounded. Switch TS1 is, for example, an optional temperature indicating switch having an associated sensor S1 for sensing temperatures in a range between 0° C.–500° C. (32° F.–932° F.). The other four switches also have associated sensors S2–S5, and are capable of monitoring temperatures in a range of 0° C.–1100° C. (32° F.–2012° F.). Each of the temperature switches TS2–TS5 is independently set to an upper temperature limit above which the equipment may not operate. Further, each switch includes its own separate reset switch to reset the sensing unit back to its initial sensing condition after a shut-down.

Temperature switch TS1 supplies an output to master firing package 64. The other temperature switches TS2–TS5 have a series connected path GP with the firing package. This common path is maintained by a set of electrical contacts within each switch. If an overtemperature condition is sensed by any of these elements, this path is opened by the contacts, an audible alarm 114 is sounded, and the power controller is shut down. After the over temperature condition which causes a shut-down is corrected, a manual push-button PB located on from panel 38 is pushed. This resets the sensor network and the contacts by which the common path is maintained back to their original position. An interlocking door switch 116 on front panel 38 is operable by a user to turn the controller "ON", or "OFF", or lock the controller in a "RESET" condition.

Figure 8A:
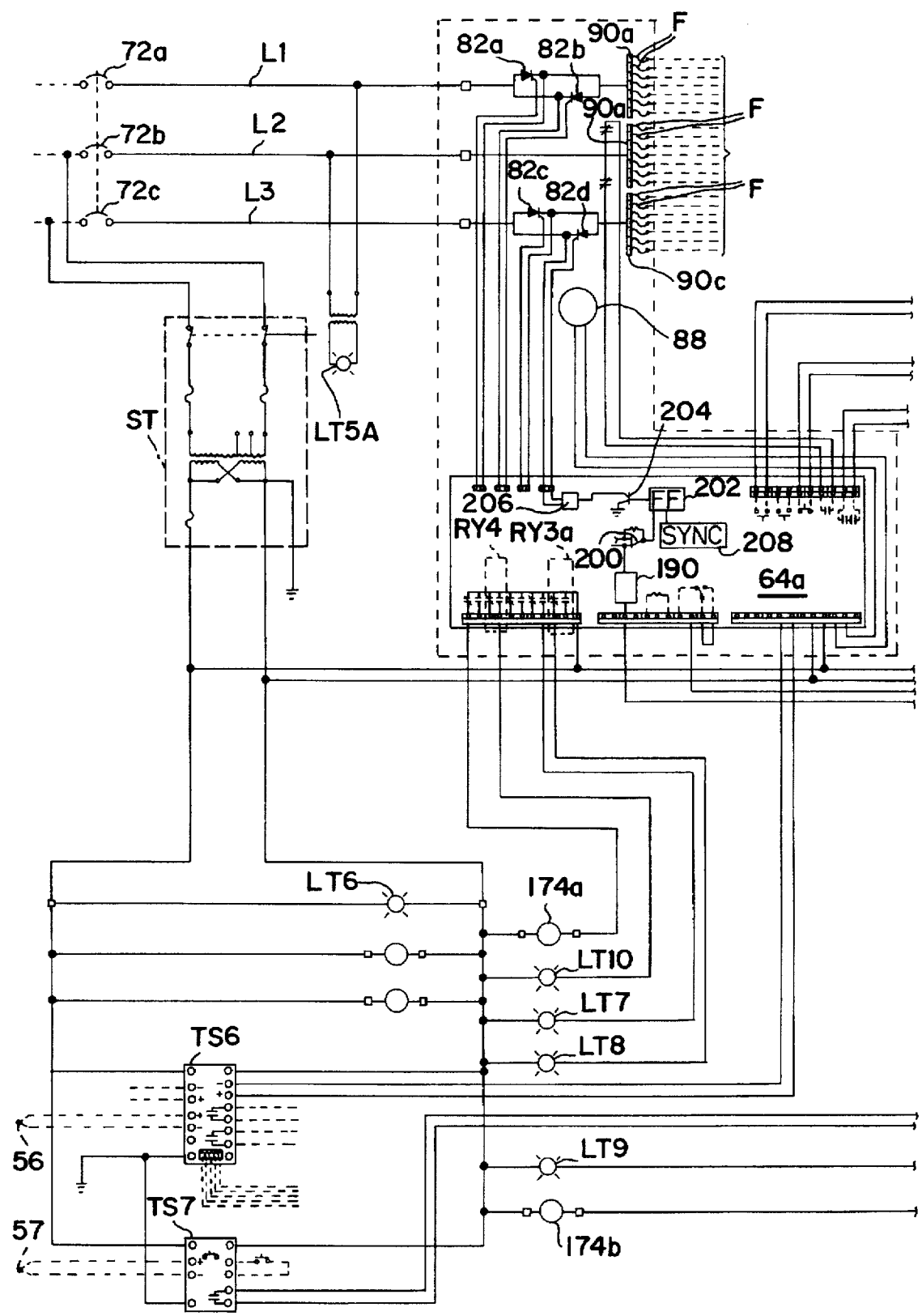
Figure 8B:
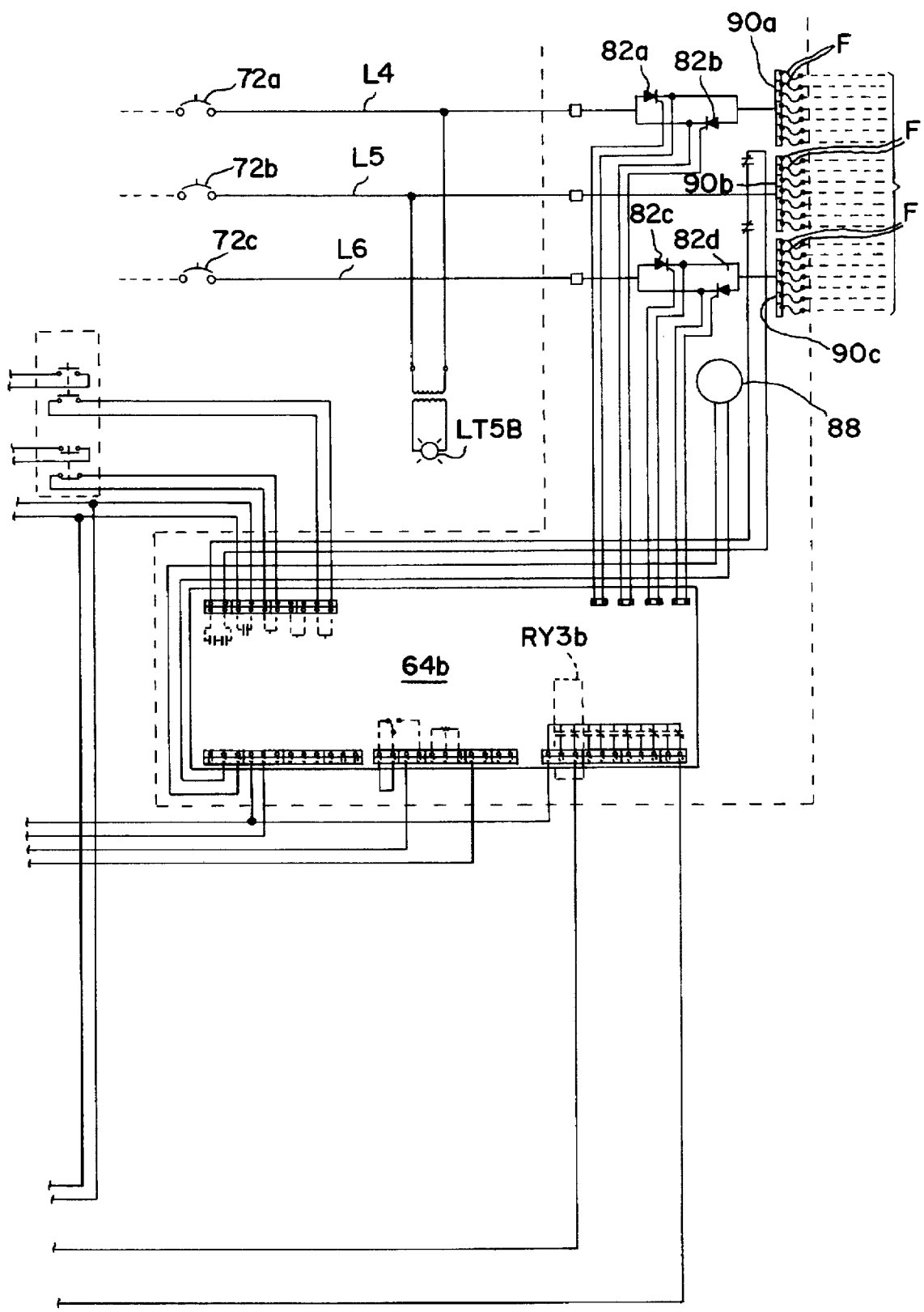

In FIG. 8, dual master firing packages 64a, 64b are supplied power through step-down transformer ST. Again, this transformer provides single-phase voltage to the firing packages, the switches and sensors used by the control means to control operation of the power controller. Transformer ST is connected across input lines L2–L3 for the one side of the controller. It will be understood it could also be connected across lines L5–L6, for example. Respective status lights LT5A and LT5B are connected across lines L1, L2 and L4, L5 to provide a visual indication when the disconnect switches are closed. Both status lights are located on door panel 138a of enclosure 22B, as is a power control indicator status light LT6. Additional status lights LT7–LT10 are also installed on panel 138a. Light LT6 is a status light indicating when the controller power is "ON". This light is connected across the secondary side of transformer ST. Light LT7 is a status light for the heater or other equipment powered by the controller. Lights LT8 and LT9 are respective status lights for heat sink temperature. Light LT8 is for the heat sinks 84 of firing package 164a, and light LT9 is for the heat sinks of package 164b. Again, both status lights are connected between the secondary of transformer ST and their respective firing packages 164. Each firing package has an associated relay RY3a, RY3b associated with the heat sink monitoring to illuminate status light LT8 or LT9 if an over temperature condition occurs. Finally, a status light LT10 is similarly controlled through a relay RY4 of firing package 164a. This status light monitors whether or not a control signal of the controller remains within a defined upper or lower limit. Typically, the control signal used by the firing package is a 4 ma–20 ma signal. This signal can be monitored so that if the amplitude exceeds 25 ma., for example, or falls below 1 ma., for example, status light LT 10 is illuminated and an alarm sounded.

This embodiment of the controller further includes temperature switches TS6–TS7 for a heater and other equipment to which the power controller is connected and whose operating condition is monitored. Both temperature switches are connected in parallel across the secondary of transformer ST. As in the other embodiment, both switches are relay type switches each of whose operation is controlled by the sensed temperature of the element monitored by the switch. Switch TS6 is a temperature indicating switch having an associated sensor S6. Switch TS7 has an associated sensor S7. Switch TS7 is settable to an upper temperature limit above which the heater may not operate. Both switches are separately operable to reset the controller back to an initial condition after a shut-down. Temperature switch TS6 supplies its output to firing package 164a. The common path GP established by appropriate electrical contacts within temperature switch TS7 is a parallel ground path to both firing packages. Again, if an overtemperature condition is sensed an audible alarm can be sounded when an overtemperature condition is sensed.

Operation of the firing package 64, and packages 164a, 164b is such that they gate the SCR's 82 associated with package on at an appropriate time. This conduction control allows current flow through lines L1 and L3, or L4 and L6 to be in accordance with an established control scheme for the controller. Since there are no SCR's associated with lines L2 or L5, these two lines are constantly available for current flow. The control means 20 portion of the firing package supplies control signals to the firing means 14 portion thereof. Firing means 14, in response thereto, supplies gating signals to the gate input of the appropriate SCR, gating it into conduction. This gating signal is an intermittent signal because once gated into conduction, the SCR continues to conduct until the current flow goes to zero. It is a unique feature of the present invention to utilize a shut-down sequence by which operation of the power controller serves to extend the operating life of the circuit breakers. When an external alarm goes off; i.e., the ground path GP is interrupted by the contact opening in one of the switches TS2–TS5, or TS7, control means 20 ceases supplying control signals to firing means 14. In turn, firing means 14 ceases supplying gating signals to the SCR's. This almost immediately stops supply of power to a heater or other piece of using equipment. That is, the gating signals cease in approximately 8.3 msec. A few milliseconds thereafter, a control signal is supplied from the control means to the disconnect switch 74, or 174a, 174b, to trip the circuit breakers 72 and disconnect the power flow from the source to the using equipment. The disconnect switch includes a shunt trip solenoid (not shown) which provides this function. Since the SCR's are solid state power devices, they operate in an arcless manner. By timing the opening of the shunt trip solenoid, so there is no load on the controller, there is no arcing when the circuit breakers open. This extends the life of the circuit breakers. Since the shut-down sequence is initiated whenever a contact in the ground path circuit changes state, the sequence is initiated regardless of whether a heater overtemperature condition occurs, or a heat sink overtemperature condition, etc. This shut-down procedure is also initiated when an operator of the controller manually turns the controller "OFF" using switch 116.

With respect to the wiring configuration of FIG. 8, the two firing packages 64a, 64b are used when the industrial equipment, such as a heater, which is connected to the heater is so large as to require both power control assemblies to provide power to it. In this circumstance, one of the packages, package 64a functions as a master firing package; while the other firing package 64b operates as a slave package. Operation of the firing packages is such that supply of power to the using equipment is alternated between the two firing packages in a unique manner.

Master firing package 64A first generates a triangular waveform as shown in FIG. 13A. The waveform has a peak amplitude, for example, of +10V or −10V with a period of approximately one second. As shown in FIG. 14A, the triangular waveform is used to generate a proportional control signal as shown in FIG. 14B. That is, the portion of the triangular waveform period the amplitude exceeds zero, represents an "ON" portion of the control signal, with the remainder of the period representing an "OFF" portion of the signal. In FIG. 14A, the triangular waveform represents a condition where approximately 50% of the available controller power needs to be supplied to the heater, for example, for it to maintain a desired temperature output. Accordingly, the triangular waveform exceeds 0V. 50% of the period. In FIG. 14B, a proportional control signal derived by the master firing package 64a from the triangular waveshape is shown to have a "1" or "ON" state 50% of each time interval and to be in a "0" or "OFF" state the remainder of the time. The proportional control signal is supplied by control means 20 to firing means 14. In response, the firing means develops the gating signals supplied to the respective SCR's to gate them into conduction.

Conditioning of the triangular waveform to produce the control signal with the requisite ON/OFF ratio is shown in FIG. 15. Here, a comparator 200 of control means 20 is supplied the triangular waveform at its inverting input. The input to the non-inverting input of the comparator is a control input which has a range, for example of +1Vdc to −1Vdc. For the triangular waveshape input shown at the inverting input of the comparator, if the control input has a value of 0Vdc (12 ma), for example, the resulting binary or time proportional output from the comparator is a signal whose proportionality is 50% ON/50% OFF. If the control signal input is, for example, at a value of 5Vdc (16 ma), the proportionality may be 75% ON/25% OFF. Where, as shown in FIG. 8, both a master and slave firing package are used to provide power to using equipment, the triangular signal developed by master firing package 64a, and the resulting proportionality signal derived therefrom, are also supplied to slave firing package 64b. However, for firing control purposes, these signals are now inverted for use by the slave package by an inversion means indicated generally 190. This is shown in FIG. 14, where the triangular waveform and derived proportionality signal for package 64a are shown in FIGS. 14A and 14B, and the inverted waveform and proportionality signal for package 64b are shown in FIGS. 14C and 14D. This method of equipment power control is advantageous in that power usage is smoother than otherwise would be possible. The inversion of the control signals allows the firing packages to share the power control on an easy to implement basis which is readily tied to the equipment's power usage. Effecting this inverse proportionality involves inverting the triangular waveform generated in the master firing package and supplying it to the slave package; or, supplying the waveform from the master firing package to the slave package and inverting it there. In either circumstance, the inverted triangular waveform is supplied to a comparator 200 within the slave package to produce the inverse proportionality signal.

The time proportional signal developed in either the master or slave firing package is used with a synchronization or sync signal to drive a flip-flop 202. The flip-flop, in turn, drives a transistor 204. The transistor output switches an optical coupler 206 "ON" and "OFF" to provide a gating input to an SCR 82. In FIG. 8, a simplified schematic illustrating this circuitry is shown with respect to master firing package 64a. Master firing package 64a, as shown in FIG. 7, and slave firing package 64b, have similar circuitry to that described. It will be understood that the circuitry as described is for only one phase of the three-phase input to the controller. The circuitry for the other two phases is similar to that described. A sync pulse generator indicated generally 208 in FIG. 16 is provided a 24Vac input from step-down transformer ST. The transformer output is provided through a first voltage divider network comprising resistors R1, R2, a 12V zener diode Z1 which regulates the input voltage, and an input resistor R3 to the non-inverting input of a comparator 210. Meanwhile, unregulated 24Vdc voltage is provided to the inverting input of the comparator through a second voltage divider network comprising resistors R4 and R5. These resistors provide a 3:1 division ratio so the comparator input is 6Vdc. The comparator also has a feedback resistor R6 between its output and the non-inverting input. When the input voltage at the non-inverting input of the comparator reaches 6V, the comparator output switches states. This will occur approximately 30° into the interval of the sine wave input to the comparator as shown in FIG. 17.

The comparator output will remain in this state until the ac voltage input falls back below 6v. This occurs at a point 150° into the interval. Thus, the comparator sync output signal has a period of 120°. The 30° point is chosen because it represents the maximum crossover point for all three phases of the power input to controller 10. Also, the point occurs at a relatively steep portion of the sine wave curve. This is important because it provides a safety margin with respect to sequencing the respective phases through gating the various SCR's. Further in this regard, the unregulated dc voltage is used for input comparison with the ac input to comparator 210 because its magnitude will vary with that of the regulated ac input. This helps to maintain the 30° firing point as much as possible.

In FIG. 19, the time proportional control signal is supplied to the D input of the flip-flop 202. The sync signal output from sync signal generator 208 is supplied to the clock or C input of the flip-flop. The positive going edge of the sync signal turns the Q output of the flip-flop "ON", if a signal element of the time proportional control signal is present at the flip-flop's D input at this time. If a control signal element is absent, the Q output is switched "OFF". As a result, only full cycles of power are supplied to the using equipment connected to controller 10. This is as shown with the signal composite in FIG. 18 which represents all three phases of the power input to the equipment. Zero crossover trigger circuits which include the optical coupler 206 gate the respective SCR's 82 into conduction at the first zero crossover which occurs after the Q output of flip-flop 202 is switched "ON". After an SCR 82 is conducting, it remain in conduction until the current flow through the SCR reaches zero. Then, if there is no voltage at the gate input to the SCR, it switches to a non-conducting state. Thereafter, only a subsequent signal to its gate input will bring it back into conduction.

What has been described is a controller for use in a power distribution network for supplying single-phase, or three-phase, as appropriate, to using equipment connected to the network. The controller has a compact design which makes it less costly to manufacture and assemble. It also requires less space when installed. To accomplish this, the controller employs bus bars rather than cabling for connecting between a power controller installed in the enclosure and circuit breakers or control switches which control power flow to the controller. Bus bars are cheaper than cables and require less labor to install. Further, the controller incorporates fuse bars on its distribution side rather than fuse blocks. Fuse bars are not only readily installed, but also cheaper than fuse blocks. Fuse bars require only 10%–15% as much space within the enclosure as conventional fuse blocks and the connecting wiring. Components installed within the enclosure are easily and readily cooled by a fan which is so situated that the last components over which air is drawn prior to being exhausted from the enclosure are those components which generate the most heat. There is a unique shutdown sequence provided for powering down the controller. This sequence enables the power controller to be rendered inactive prior to opening any circuit breakers so the circuit breakers are opened under no load conditions. This eliminates electrical arcing. Using the sequence prolongs the useful life of the circuit breakers. The controller senses the temperature of heat sinks on which SCR's of the power controller are mounted, and initiates the shutdown sequence if the sensed heat sink temperature exceeds a predetermined value. Shutdown is also initiated if control signals supplied to a firing package which gates the SCR's into conduction are found to be out of tolerance. An audible alarm sounds in the event of a shutdown. Finally, the controller incorporates two separate power distribution network controls and incorporates both a master and a slave firing package.

In view of the foregoing, it will be seen that the several objects of the invention are achieved and other advantageous results are obtained.

As various changes could be made in the above constructions without departing from the scope of the invention, it is intended that all the matter contained in the above description or shown in the accompanying drawings shall be interpreted as illustrative and not in a limiting sense.

Having thus described the invention, what is claimed and desired to be secured by Letters Patent is:

1. A power controller for use in supplying power to a power distribution network in which power from a polyphase source thereof is routed to using equipment connected to the network through the power controller comprising:

switch means for routing separate phases of the polyphase power from the source to the equipment;

firing means for gating the switch means to enable the switch means to route the power;

fuse means connected between the switch means and the using equipment to interrupt power flow to the equipment if the equipment begins drawing excessive current;

circuit breaker means connected between the power source and the switch means for interrupting flow of current to the switch means if excessive current is drawn by the using equipment;

control means for controlling a shutdown sequence when excessive current is being drawn; and, enclosure means including mounting means for commonly mounting the switch means, firing means, fuse means, circuit breaker means and control means, and cooling means for directing air flow through the mounting means to cool the aforesaid switch means, firing means, fuse means and circuit breaker means.

2. The power controller of claim 1 wherein the mounting means comprises a frame installed in the enclosure with the fuse means being connected to one side of the frame, the circuit breaker means on the opposite side of the frame.

3. The power controller of claim 2 wherein the frame comprises a generally U-shaped frame with the switch means installed in a channel formed by the opposed legs of the frame.

4. The power controller of claim 3 wherein the fusing means comprises a fuse bar mounted on one leg of the frame, said fuse bar being electrically connected to the switch means.

5. The power controller of claim 4 wherein the fuse means comprises a plurality of fuses bars each of which is electrically connected to the switch means, and a plurality of fuse elements, one for each separate piece of electrical equipment or to a separate circuit of the same equipment to which power is supplied through the controller, a plurality of fuse elements being attachable to each fuse bar.

6. The power controller of claim 5 wherein the circuit breaker means comprises a plurality of electrical connectors, one for each phase, extending outwardly from the opposite leg of the frame.

7. The power controller of claim 6 wherein each electrical connector comprises a flat connector and the circuit breaker means includes a circuit breaker unit having mating electrical connectors for insertion of the unit onto the flat connectors to electrically connect the circuit breaker unit to the power controller, the circuit breaker unit further being electrically connected to the polyphase source of power.

8. The power controller of claim 7 wherein the switch means comprises a plurality of solid state switches mounted between the opposed legs of the frame.

9. The power controller of claim 8 wherein the cooling means includes a fan installed at one end of the frame for pulling air between the legs of the frame over the switch means, the enclosure means including a panel at the opposite end of the frame from the fan, when the frame is installed in the enclosure, in which an opening is formed for heated air to be exhausted from the enclosure.

10. The power controller of claim 9 wherein the switch means further includes a plurality of heat sinks on which the respective solid state switches are mounted, the heat sinks fitting between the legs of the frame and having openings therein for air driven by the fan to pass over the heat sinks and draw off heat generated by operation of the solid state switches.

11. The power controller of claim 10 further including clamp means for holding the SCR clamp to the lower heat sink allowing the SCR to be readily changed.

12. The power controller of claim 11 further including an audible alarm installed in the enclosure and operable by the control means when a high temperature condition is present on the controlled equipment or on the heat sinks.

13. The power controller of claim 1 wherein the enclosure means includes a rear panel, opposed side panels, top and bottom panels, and a manually operable door, the mounting means including a frame mounted on the back panel of the enclosure means for access thereto when the door is opened.

14. The power controller of claim 13 wherein the enclosure means further includes openings formed in the respective side panels for circulating air through the enclosure.

15. The power controller of claim 14 wherein the frame is a generally U-shaped frame with the switch means installed inside a channel formed by the opposed legs and top of the frame, and the firing means and control means being installed on the opposite side of the frame top outside the channel.

16. The power controller of claim 15 wherein the fuse means comprises a plurality of fuse bars electrically connected to the switch means, and a plurality of fuse elements each of which is separately attachable to a fuse bar.

17. The power controller of claim 16 wherein the circuit breaker means comprises a plurality of electrical connectors, one for each phase, extending outwardly from the opposite leg of the frame, each electrical connector forming a flat connector, the circuit breaker means further including a circuit breaker unit electrically connected to the power source and having mating electrical connectors for insertion of the unit onto the flat connectors to electrically connect the circuit breaker unit to the power controller.

18. The power controller of claim 17 the switch means comprises a plurality of solid state switches and a plurality of heat sinks on which the respective solid state devices are mounted, the heat sinks fitting between the legs of the frame and having openings therein for air to flow over the heat sinks and draw off heat generated by operation of the solid state devices.

19. The power controller of claim 18 wherein the cooling means includes a fan installed at one end of the frame for pulling air between the legs of the frame over the heat sinks, the fan drawing air through respective openings in the side panels and exhausting air through an opening in a side panel at the opposite end of the frame from the fan.

20. The power controller of claim 19 further including clamp means for holding the SCR clamp to the lower heat sink allowing the SCR to be readily changed.

21. An enclosure for a power controller used to direct power from a polyphase source to using equipment connected to a power distribution network, the power controller including a plurality of solid state switches for routing each separate phase of the polyphase power from the source to the equipment, firing means for gating the switches into conduction, electrical fuses connected between the switches and the using equipment to interrupt power flow to the equipment if the equipment draws excessive current, and circuit breakers connected between the power source and the switches for interrupting current flow if excessive current is drawn by the network, the enclosure comprising:

a rear panel;

opposed side panels;

top and bottom panels;

a manually operable door;

mounting means for commonly mounting the switches, firing means, fuses, and circuit breakers, the mounting means including a frame mounted on the back panel of the enclosure for access thereto when the door is opened; and, cooling means for directing air flow through the mounting means to cool the aforesaid switches, firing means, fuses and circuit breaker.

22. The enclosure of claim 21 further includes openings formed in the respective side panels for circulating air through the enclosure.

23. The enclosure of claim 22 wherein the frame is a generally U-shaped frame having a channel formed by the opposed legs and top of the frame, the switches being mounted on heat sinks installed inside the channel and the firing means being installed on the opposite side of the frame top outside the channel.

24. The enclosure of claim 23 wherein the fuses comprise a plurality of fuse bars extending outwardly from one leg of the frame and electrically connected to the switches, and a plurality of fuse elements, each of which is separately attachable to a fuse bar, and each of which is for a separate piece of electrical equipment to which power is supplied through the enclosure.

25. The enclosure of claim 24 further including a circuit breaker unit installed in the enclosure, the circuit breaker comprising a plurality of electrical connectors, one for each phase, extending outwardly from the opposite leg of the frame from the fuse bars, each electrical connector forming a flat connector, and the circuit breaker unit being electrically connected to the power source and having mating electrical connectors for insertion of the unit onto the flat connectors to electrically connect the circuit breaker unit to the switches.

26. The enclosure of claim 25 wherein the cooling means includes a fan installed at one end of the frame for blowing air between the legs of the frame over the heat sinks, the fan drawing air through respective openings in the side panels and exhausting air through the opening in a side panel at the opposite end of the frame from the fan, thereby to draw off heat generated by the solid state switches.

27. The enclosure of claim 25 further including clamp means for attaching the heat sinks to the frame, the clamp means allowing the heat sinks to be readily removed to facilitate replacement of a solid state device.

28. The enclosure of claim 21 further including a second set of solid state switches for routing power from a source to the equipment, firing means for gating the switches into conduction, electrical fuses to interrupt power flow to the equipment, and circuit breakers connected between the power source and the switches for interrupting current flow, a second generally U-shaped frame for mounting the switches and the firing means, and a fan for directing air flow through the second frame, the first and the second frames being installed side-by-side within the enclosure.

* * * * *

UNITED STATES PATENT AND TRADEMARK OFFICE
CERTIFICATE OF CORRECTION

PATENT NO. : 5,670,936,

DATED : 9/23/97

INVENTOR(S) : Estes et al.

It is certified that error appears in the above-identified patent and that said Letters Patent are hereby corrected as shown below:

In the Abstract: delete "con._roller" and insert -- controller --

Col. 4, ln. 38: delete "muting"; insert -- routing --

Signed and Sealed this

Twenty-fourth Day of March, 1998

Attest:

BRUCE LEHMAN

Attesting Officer

Commissioner of Patents and Trademarks